April 27, 1937.   P. KOLLSMAN   2,078,574
COMPENSATING DEVICE FOR MAGNETIC COMPASSES
Filed April 20, 1933   2 Sheets-Sheet 1
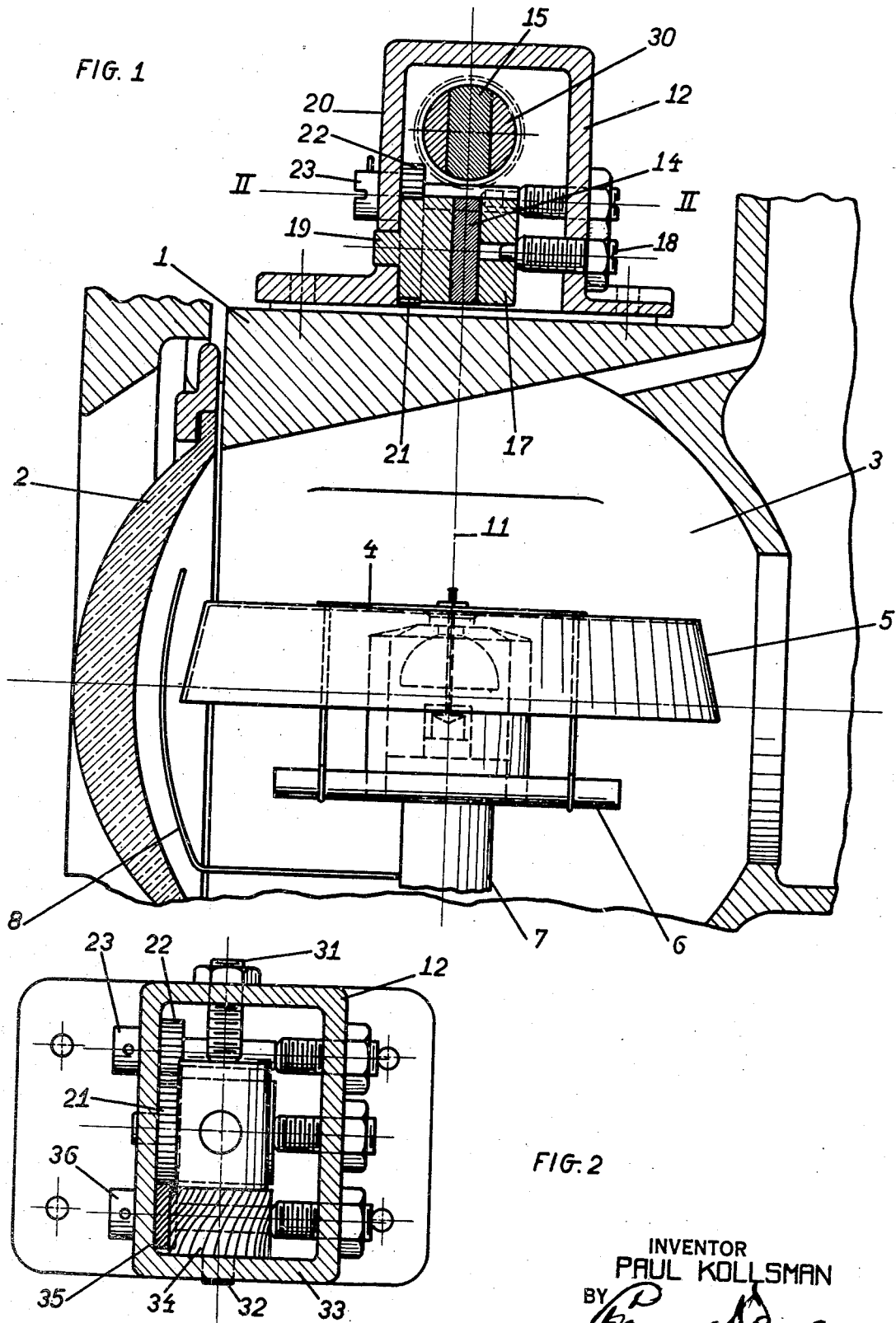
INVENTOR
PAUL KOLLSMAN
BY
ATTORNEY April 27, 1937.　　　　　P. KOLLSMAN　　　　　2,078,574
COMPENSATING DEVICE FOR MAGNETIC COMPASSES
Filed April 20, 1933　　　　2 Sheets-Sheet 2
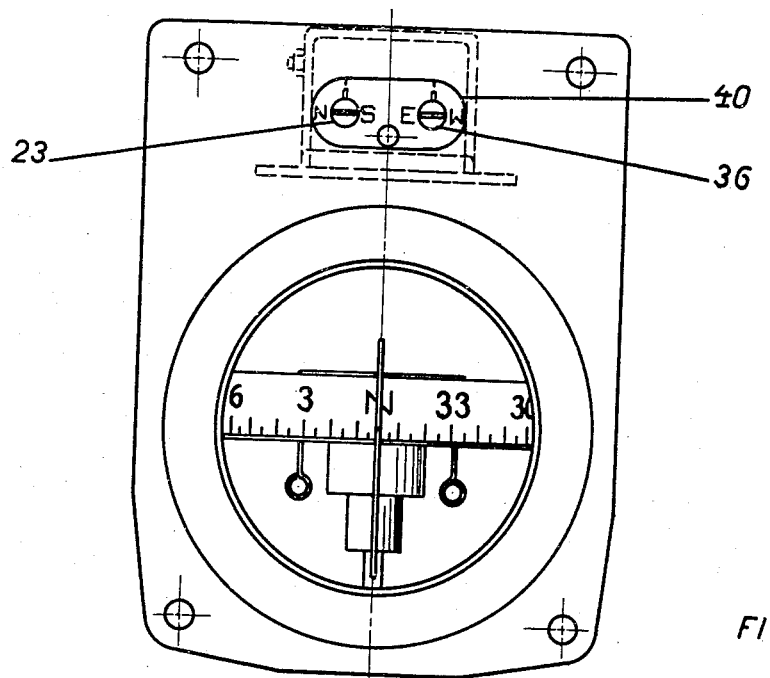
FIG. 3
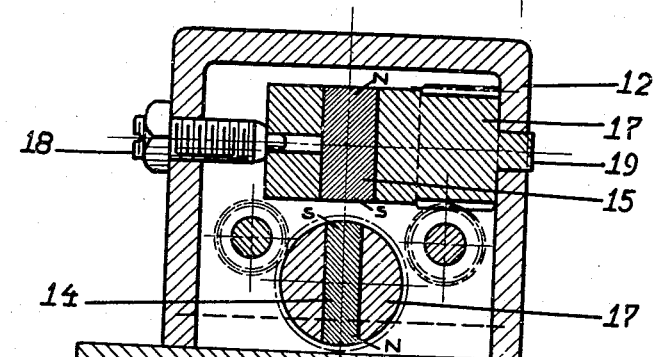
FIG. 4
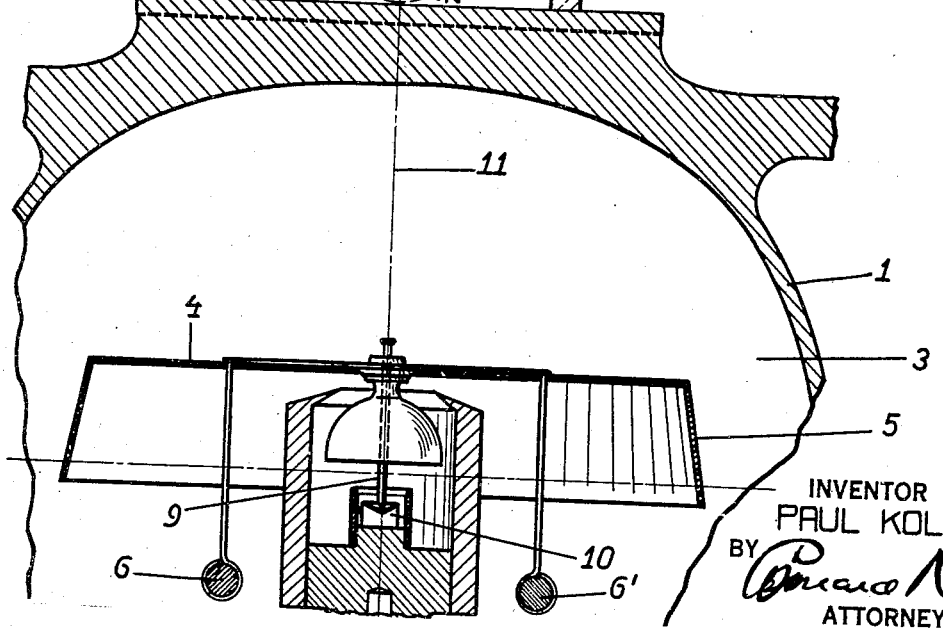
INVENTOR
PAUL KOLLSMAN
BY
ATTORNEY Patented Apr. 27, 1937

2,078,574

UNITED STATES PATENT OFFICE 2,078,574

COMPENSATING DEVICE FOR MAGNETIC COMPASSES

Paul Kollsman, New York, N. Y.

Application April 20, 1933, Serial No. 667,071

2 Claims. (Cl. 33—225)

This invention relates to magnetic compasses.

The object of the invention is to improve the method and means employed for adjusting the compass to compensate against local attractions tending to deviate the compass needle.

More particularly, in carrying out this object of the invention, it is purposed to employ compensating magnetic means so shaped and positioned when adjusted for zero compensation as to concentrate the lines of magnetic force to be employed for compensation in substantial alignment with the axis of rotation of the compass card.

I further purpose, in carrying out the object of my invention, in adjusting my compensating means to effect the adjustment from a condition of no magnetic influence, regardless of the wobble of the compass card up to a component or components of magnetism effective in a plane at right angles to the axis of rotation of the compass card in contradistinction to the provision of compensating magnetic fields, the concentrated lines of which are in planes parallel to the plane of rotation of the compass card. Stated differently, I purpose a concentration of my compensating magnetic field for zero compensation substantially along the axis of rotation of the compass card and, of course, of its controlling magnets or needles, and then, by tilting of the concentrated bundles of my compensating lines of force, to create just sufficient horizontal component or components in a plane at right angles to the axis of the rotation of the compass card to compensate against local attractions such as may tend to deviate said card from true response to the magnetism of the earth.

In carrying this into effect, my compensating magnets not only are in tandem along the axis of rotation of the compass card, but they are close together, and the one farther away from the compass card larger than the nearer one, whereby the magnet at the greater distance, by reason of its larger size, may be made to more nearly approximate the magnetic effect of the nearer magnet. For the zero compensating position, it should be noted, as is clearly indicated in Fig. 4 of the drawings, that like poles of the two compensating magnets are against each other, whereby substantial local neutralization of their magnetism is effected in addition to what may remain having its axis of concentration in the axis of rotation for the compass card.

It is further an object of the invention to improve generally compensating means in a magnetic compass.

The above will all better be understood by reference to the illustrative embodiment of my invention to which the following specification and claims are directed, solely for purposes of illustration. This embodiment is shown in the accompanying drawings which form a part hereof.

Fig. 1 is a cross-section of a magnetic compass fitted with one embodiment of my compensating device and with parts broken away;

Fig. 2 is a horizontal section taken along line II—II of Fig. 1 of the compensator;

Fig. 3 is a front view of a compass fitted with my compensator on the instrument board; and Fig. 4 is a section through the structure shown in Fig. 1 at right angles thereto and with parts broken away.

It is to be understood that the actual construction and design of the magnetic compass combining with my compensating means is substantially immaterial, although I have illustrated a specific form of magnetic compass in which 1 indicates the casing, the visual opening of which is closed by a lens window 2 to complete an interior chamber 3 for containing the usual damping liquid. The compass card 4 provides the usual scale face 5 and is operated by a pair of spaced parallel compass needle magnetic bars 6 and 6', symmetrically positioned and diametrically spaced in the compass card structure which is mounted to swivel on the fixed post 7 in cooperation with the index finger 8 which cooperates with the indices on the face 5. Any satisfactory pivoting or swiveling means, such as the pin 9 and socket 10, define the axis of rotation for the compass card which is indicated by the line 11 in the drawings.

In the present embodiment of my compensating magnetic means, a box 12 is detachably mounted upon the casing 1, in the present instance on the top of the casing, although it is contemplated that it might be mounted on the bottom of the casing. The essential of my design is to position my compensating permanent magnet bars 14 and 15 in alignment with the axis 11 for their non-compensating position of adjustment. These bars are mounted for tilting in planes at right angles to each other and passing through the axis 11 in a manner convenient for adjustment. The magnet 14 is centrally and diametrically mounted in the rotatable cylinder 17 of non-magnetic material which has a bearing at one end on the tip of the screw pin 18 and at the other end by the boss 19 in the box wall 20. One end of the cylinder 17 is formed into, or fitted with, a toothed gear 21 meshing with the adjusting spur gear 22, which is exteriorly operated by the screw driver manipulable boss 23. By this boss and spur gear, the cylinder 17 is rotatable upon an axis at right angles to the compass card axis 11 and in the plane of the paper of Fig. 1.

The other cylinder 30 mounting the permanent magnet bar 15 is rotatable upon an axis at right angles to that of the cylinder 17. It is journaled as indicated in Fig. 2 on the screw pivot pin 31 and by the boss 32 in wall 33. At one end of this cylinder is provided a worm gear 34 meshing with the worm 35 which is operable exteriorly of the box by the screw driver engageable boss 36. By this arrangement of worm and spur gear drive, both bosses 23 and 36 are adjustable from the same direction, which may be chosen as that most accessible. It has been chosen in my illustrated embodiment as the front of the compass, so that ready adjustment may be effected through the adjusting window 40. By this mounting for positions of no compensation, the two bar magnets 14 and 15 are in tandem array and are positioned and directed in an extension of the axis 11 for the compass card. To adjust them in compensation against local attractions, they are tilted to the necessary degree out of this axial position, whereby horizontal components of magnetic force in planes at right angles to each other are created to exert just the necessary compensating torque upon the magnets 6 and 6' of the compass card. These compensating bar magnets concentrate bundles of magnetic lines which, for their position of no compensation, can exert no disturbing effect upon the compass card regardless of its wobble out of the horizontal plane indicated in the figures.

In the preferred embodiment, the bar magnet 15, located farther away from the compass card magnets 6 and 6', is made larger, that is of greater diameter, than the bar magnet 14. By making the magnet 15 larger, the tendency for its effect to be lessened by reason of its greater distance may be offset. For zero compensating position, like poles of the magnets 14 and 15 are contiguous, whereby local neutralizing is effected.

It is preferred that indicators be provided whereby a visible indication of the set of the compensating magnets may be noted outside of the casing 12. These indicators in the present embodiment are in the form of upstanding pins for the manipulating bosses 23 and 36. These pins are particularly well indicated in Figs. 1 and 3, Fig. 3 indicating a scoring on the casing 12 to which the pins point and indicate the zero neutralizing position.

It should also be noted that the length of compensating magnet 14 is approximately one-fifth of the distance between its center and the plane of the compass needle magnets 6 and 6'. It has been found that the total compensating length of a compensating magnet should be only a fraction of its distance from the compass needle magnets.

It is also to be noted that only the exact degree of magnetic component in a plane at right angles to the axis 11 is ever produced so that there is always a minimum magnetic disturbance upon the compass card regardless of its tilt from its normal position indicated in the drawing.

What I claim and desire to secure by United States Letters Patent is:

1. In combination in a compensating magnetic compass, a compass card having a pair of symmetrically positioned diametrically opposed compass needle magnets; means for swivelling said compass card and for defining its axis of rotation; a first compensating bar magnet; rotary means adjustably mounting said compensating bar magnet to tilt from a position with its axis aligned with the axis of rotation of said compass card to a position at right angles thereto; a second compensating bar magnet locally of greater pole strength than said first compensating bar magnet; and rotary means adjustably mounting said second compensating bar magnet farther away from said compass card than is said first bar magnet and to tilt from a position with its axis aligned with the axis of rotation of said compass card to a position at right angles thereto and at right angles to said first compensating bar magnet in its extreme tilted position.

2. The structure in combination as specified in claim 1 further specified by the fact that said first and second compensating bar magnets are specified only as bar magnet means, the magnetic axes of which are aligned with the axis of rotation of the compass card, but which means are adjustably rotatable to displace these magnet axes at right angles to each other and individually symmetrically at an angle with said axis of rotation.

PAUL KOLLSMAN.